UNITED STATES PATENT OFFICE.

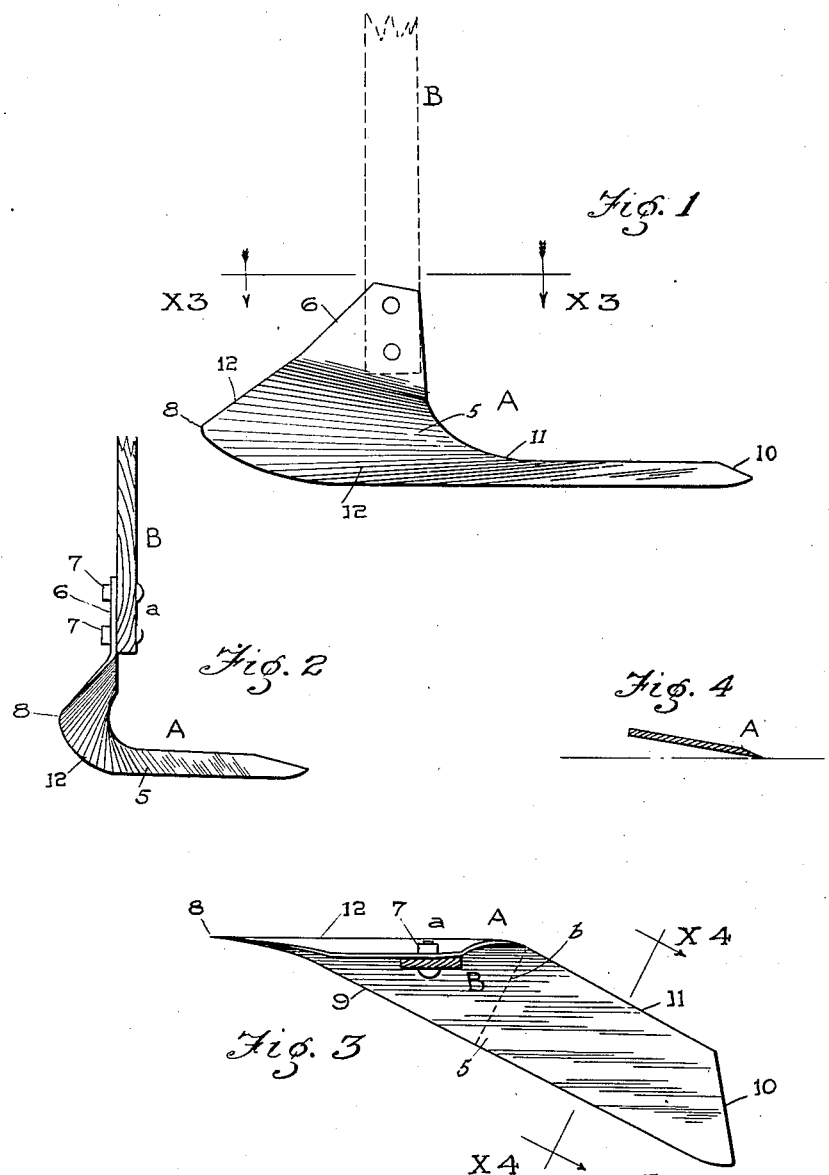

ALBERT L. LEIGHTON, OF ARTESIA, CALIFORNIA.

CULTIVATOR.

1,219,013.  Specification of Letters Patent.  Patented Mar. 13, 1917.

Application filed December 16, 1916. Serial No. 137,395.

*To all whom it may concern:*

Be it known that I, ALBERT L. LEIGHTON, a citizen of the United States, residing at Artesia, in the county of Los Angeles and State of California, have invented new and useful Improvements in Cultivators, of which the following is a specification.

This invention relates to cultivators, and more particularly to cultivator blades, such cultivators being utilized for stirring up the earth adjacent to or between rows of beets and other plants. The invention has for its object to provide an improved cultivator blade, adaptable to a wide range of cultivators for different specific purposes, which in conjunction with superiority in relative simplicity and inexpensiveness of manufacture and durability and length of life, will be superior in use and service as to its operative effect upon the soil, so as to produce a highly satisfactory cultivating effect, or stirring up of the earth adjacent to the plants, and a proper final disposition of the soil so agitated or stirred up. In previous cultivator teeth the objection has been encountered that the soil, while more or less efficiently stirred up or agitated and re-disposed, has been left by the moving tooth improperly distributed or heaped up about or upon or over the plants in the adjacent rows, and especially plants which have not reached a growth of maturity to render non-objectionable such improper distribution of the soil. It is a particular object of the present invention to provide a cultivator blade which while thoroughly and effectively agitating and stirring up and re-disposing the soil, will leave the same evenly and properly distributed or disposed so as to avoid any such objectionable heaping of the soil or its deposition upon the plants or young growths or the leaves and shoots of the same.

With the above and other objects in view, the invention consists in the novel and useful provision, formation, proportioning, disposition, association and relative arrangement of parts, surfaces, members and features, all as hereinafter described, shown in the drawing and finally pointed out in claim.

In the drawing:

Figure 1 is a side elevation of a cultivator blade formed and organized in accordance with the invention and attached to a cultivator frame member or blade support, in position and disposition for use;

Fig. 2 is a front end elevation of the same;

Fig. 3 is a horizontal sectional view taken upon the line $x^3$—$x^3$, Fig. 1, and looking in the direction of the appended arrows; and Fig. 4 is a detail transverse sectional view taken upon the line $x^4$—$x^4$, Fig. 3, and looking in the direction of the appended arrows.

Corresponding parts in all the figures are designated by the same reference characters.

Referring with particularity to the drawing, A designates the improved cultivator blade therein shown as embodying or constructed to embody the invention; B designating a cultivator frame member or cultivator blade support in connection with which such blade A is shown as mounted as at $a$.

The cultivator blade comprises an elongated body 5 from the upper forward portion of which rises a shank or stock 6 which is connected with the frame member or support B, as by bolts and nuts 7, so that the same may be removed for purpose of replacement, repair, sharpening or the like. The forward end of the body 5 terminates in a leading point 8, from which the lowermost edge portion 9 of the body, ranges rearwardly the entire length of the body, merging into an upwardly and forwardly inclined rearward edge portion 10, which in turn merges into a top edge portion 11. From the leading point 8 a forward edge portion 12 ranges upwardly and rearwardly to merge with the shank 6 at its forward portion, the rearward portion of said shank 6 merging into the top edge portion 11 of the body. The bottom edge portion 9 is so developed as to lie substantially in a common plane which is related at an angle of approximately 90 degrees to the plane of the body portion 5 rearwardly of the shank 6 or of the transverse zone of the shank 6 indicated in dotted lines at $b$ in Fig. 3, forwardly of which transverse zone the body 5 partakes of a broad curvature extending in a general downward and forward direction ranging from the upper edge 11 of the shank to the leading point 8 thereof. This curvature, shown at 12, produces a slight lateral offset of the leading point 8 without, however, disturbing the formation of the lower edge 9 whereby, as stated, it lies substantially in a common plane throughout its length. This lower edge portion 9 and the plane of extension thereof lengthwise of the body also is in angular relation to the plane of the shank 6, at an angle of substantially 30 degrees or thereabouts. It is to be understood that the shank 6 extends when supported in position for service in substantially a vertical plane; and the formation and relation of the parts above set forth produces the angularity as between the body portion rearward of the zone *b* with its lower edge 9 and the shank portion 6. Likewise, the curvature at 12 produces a slight upward range of the forward portion of the lower edge 9, beneath the shank 6, so that the leading point 8 is slightly elevated above the horizontal plane in which the major portion of the lower edge 9 lies in the cultivating operation. Likewise, this forward leading portion or point or nose 8 lies substantially in a vertical plane, slightly directed angularly to the plane of the shank 6 in a direction opposite to the angular relation of the lower edge 9 to the shank 6. As clearly shown in Fig. 4, the body portion rearwardly of the zone *b* assumes a position in slight angularity to the horizontal, of some 15 degrees or thereabouts, when the parts are in the positions produced by maintaining the shank 6 in a vertical position.

In the use and employment of the cultivator blade constructed to embody the invention, referring particularly to the foregoing description and the accompanying drawing, with the parts illustrated as properly disposed in accordance with the drawing, the edge 9 from its rearward end to its upwardly directed forward end at the leading point or nose 8, constitutes the cutting, scraping or soil-engaging and penetrating working edge. Due to the particular formation and inter-relation of parts and surfaces and the particular disposition of the material of the blade and its relation to and maintenance in position by the shank 6, the soil, obliquely attacked by the blade, closely adjacent to the row of plants, (the leading point or nose 8 being caused to just clear the row of plants as it advances), will be slightly elevated due to the inclination of the body portion 5 with respect to the horizontal, the soil engaged by the blade being in effect moved upwardly and rearwardly over the body portion of the blade and by the curvature 12 led into a generally rearward course, and prevented from bunching or heaping upwardly and escaping too abruptly over the top edge 11 of the blade. It is thus caused to be evenly distributed over the upper surface of the slightly inclined blade and to be gradually and evenly re-disposed rearwardly of the advancing blade, devoid of mounds, heaps or other accumulations about or upon the plants or growths. Likewise, any weeds in the path of the advancing blade are either dislodged, roots and all, or if deeply enough seated in the soil are severed by the cutting edge 9, and such weeds are so disposed rearwardly of the blade, either the severed portions thereof or the weeds so dislodged in entirety, intermixed with the soil. Due to the fact that the cutting edge 9 conforms throughout its length approximately to a common plane, and is devoid of any material twist or curvature in the direction of its development, the soil is engaged, loosened and passed rearwardly over the blade and re-disposed without any untoward disturbance causing heaping or mounding thereof.

It will be manifest that many changes and departures may be made in specific formation and construction of cultivator blades embodying the invention, with reference to the particular organization disclosed in the drawing and hereinabove described, all without departing from the spirit of the invention and a fair interpretation thereof.

Having thus disclosed my invention, I claim and desire to secure by Letters Patent:

A cultivator blade adapted to be applied to the earth progressively in close proximity to a row of plants, comprising an elongated body, means for supporting said body in position for service, and with a portion thereof inclined to the horizontal, said body being provided with a lower cutting edge portion lying substantially in a common plane approximately at right angles to the angle of inclination of the inclined body portion, said body likewise having an oblique transverse curvature extending from a predetermined point in its upper edge portion to its leading edge portion whereby said leading edge portion is slightly curved or offset laterally.

In testimony whereof, I have signed my name to this specification in the presence of two subscribing witnesses.

ALBERT L. LEIGHTON.

Witnesses:
ALFRED H. DAEHLER,
FRANCIS L. ISGRIGG.